Patented Nov. 22, 1927.

UNITED STATES PATENT OFFICE.

HEINRICH GÜNZLER AND GEORG WESENBERG, OF ELBERFELD, GERMANY, ASSIGNORS TO WINTHROP CHEMICAL COMPANY, INC., OF NEW YORK, N. Y.

STABLE MIXTURE YIELDING SALTS OF HALOGENSULFONAMIDS.

No Drawing. Application filed September 8, 1925, Serial No. 55,175, and in Germany October 18, 1924.

The present invention is based on the discovery that it is unnecessary, when using the salts of sulfo-halogenamids, to isolate these bodies and that simply a mixture of the respective sulfonamid as such or in the form of a salt such as the potassium salt with calcium hypochlorite preferably supplied as chloride of lime or bleaching powder can be employed.

It is a surprising fact that these mixtures are stable and that on pouring them into water the desired chlorine derivative of the organic nitrogen compound is formed immediately without the application of heat and moreover the reaction goes to completion since no free hypochlorite remains. This represents a considerable improvement compared with the method used heretofore for applying these compounds.

For applications, such as washing and bleaching, the presence of salts of bases which produce insoluble compounds with the components of the washing materials, e. g., with the soap, is undesirable.

This disadvantage is easily obviated by adding to the mixture a salt which will give an insoluble or a difficultly soluble compound with the base of the hypochlorite.

The mixtures above described can be used for all purposes for which calcium hypochlorite and chloroamids are used.

They possess, however, the advantages of having a less violent action and are cheaper. Accordingly they are particularly useful for all classes of disinfection, as for instance washing and bleaching, etc.

In order to further illustrate my invention the following examples are given, it being understood that various other embodiments falling within the scope of the annexed claims are possible.

*Example 1.*—22.9 parts by weight of a chloride of lime containing 62.1% of calcium hypochlorite and 34.4 parts by weight of p-toluolsulfonamid are intimately mixed ready for use.

*Example 2.*—22.9 parts by weight of a chloride of lime containing 62.1% of calcium hypochlorite, 34.4 parts by weight of p-toluolsulfonamid and 15.0 parts by weight of sodium carbonate (calcined) are intimately mixed ready for use.

*Example 3.*—22.9 parts by weight of a chloride of lime containing 62.1% of calcium hypochlorite, 42.0 parts by weight of potassium toluolsulfonamid and 19.5 parts by weight of Glauber's salt are intimately mixed ready for use.

Having now particularly described the nature of my invention and in what manner the same is to be performed, what I claim is:

1. A process for the manufacture of stable mixtures yielding salts of halogensulfonamids on treatment with water which comprises mixing a sulfonamid with calcium hypochlorite.

2. A process in accordance with claim 1, wherein a salt, which will form an insoluble or difficultly soluble compound with calcium, is added to the mixture.

3. A stable mixture yielding a salt of a halogensulfonamid on treatment with water, comprising a sulfonamid and calcium hypochlorite.

4. A stable mixture yielding a salt of a halogensulfonamid on treatment with water comprising a salt of a sulfonamid and calcium hypochlorite.

5. A stable mixture yielding a salt of a halogensulfonamid on treatment with water, consisting of a sulfonamid, calcium hypochlorite, and a salt which gives a practically insoluble calcium salt.

6. A stable mixture yielding the calcium salt of chloroparatoluolsulfonamid, on treatment with water, comprising paratoluolsulfonamid and calcium hypochlorite.

7. A composition of matter suitable for bleaching, disinfecting, and similar purposes, comprising about 22.9 parts by weight of chloride of lime and about 34.4 parts by weight of paratoluolsulfonamid.

In testimony whereof we have hereunto set our hands.

HEINRICH GÜNZLER.
GEORG WESENBERG.